United States Patent
Pajevic et al.

(10) Patent No.: US 11,518,022 B1
(45) Date of Patent: Dec. 6, 2022

(54) MOBILE DRIVE UNIT HAVING A CONVEYOR MODULE SPACED APART FROM A CHASSIS UNIT

(71) Applicant: Amazon Technologies, Inc., Seattle, WA (US)

(72) Inventors: Dragan Pajevic, Arlington, MA (US); Timothy Martin, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 741 days.

(21) Appl. No.: 16/456,529

(22) Filed: Jun. 28, 2019

Related U.S. Application Data (60) Provisional application No. 62/855,691, filed on May 31, 2019.

(51) Int. Cl.
| | | |
|---|---|---|
| *B25J 5/00* | (2006.01) |
| *B66F 9/06* | (2006.01) |
| *B25J 9/00* | (2006.01) |
| *B65G 43/08* | (2006.01) |
| *G05D 1/02* | (2020.01) |

(52) U.S. Cl.
CPC ............. *B25J 5/007* (2013.01); *B25J 9/0093* (2013.01); *B65G 43/08* (2013.01); *B66F 9/063* (2013.01); *B65G 2203/042* (2013.01); *G05D 1/0268* (2013.01); *G05D 2201/0216* (2013.01)

(58) Field of Classification Search
CPC .......... B25J 5/007; B25J 9/0093; B66F 9/063; G05B 19/41895; G05D 1/0268; G05D 2201/0216; Y10S 901/01
See application file for complete search history.

(56) References Cited

U.S. PATENT DOCUMENTS

| | | | |
|---|---|---|---|
| 10,894,664 B1* | 1/2021 | Brady | B65G 1/1378 |
| 2016/0167557 A1* | 6/2016 | Mecklinger | B60P 1/02 414/812 |
| 2016/0167888 A1* | 6/2016 | Messina | B65G 41/008 198/315 |
| 2018/0327184 A1* | 11/2018 | Sibley | B25J 9/1694 |
| 2019/0291956 A1* | 9/2019 | Pajevic | G05D 1/0227 |

FOREIGN PATENT DOCUMENTS

DE          102017202811 A1 *   8/2018

* cited by examiner

*Primary Examiner* — Dale Moyer
(74) *Attorney, Agent, or Firm* — BakerHostetler (57) ABSTRACT

A mobile drive unit includes a pivot between the front chassis unit and the rear chassis unit, which both support a support structure that pivotally supports a payload unit. A conveyor is supported by the chassis assembly and located at least at an ergonomic height.

20 Claims, 6 Drawing Sheets

MOBILE DRIVE UNIT HAVING A CONVEYOR MODULE SPACED APART FROM A CHASSIS UNIT

BACKGROUND

The invention relates to robotic devices and methods, and more particularly to a mobile drive unit for transporting a payload.

Movement of products in a modern warehouse environment, such as a package sort center, in which packages are moved within a facility, occurs on a vast scale. One means to sort packages (i.e., payloads) is to use mobile drive units to deliver packages to destinations designated by the ultimate final destination of the package. For example, mobile drive units can be used to organize packages based on delivery route, as determined based on a postal code or other package features. Mobile drive units are self-powered robotic devices that travel on the floor of the warehouse guided by, for example, fiducial markers in or on the floor.

Mobile drive units use various mechanisms for loading, transporting, and unloading of payloads. One type of mobile drive unit waits until the payload is placed on or in the mobile drive unit's payload unit. To unload the payload, some mobile drive units use a lifting tray that rests on or that pivots around one end of the tray to dump the payload, similar to how a dump truck functions.

DETAILED DESCRIPTION OF ILLUSTRATIVE EMBODIMENTS

A mobile drive unit ("MDU") 10 includes a chassis assembly 12 of a vehicle, such as an autonomous or semi-autonomous robot, that supports a payload unit 14, capable of carrying a package (or other payload) in a sort center at an ergonomic height. The term "payload" is used herein to refer to any item typically moved in commerce, including but not limited to boxes, envelopes (such as jiffy mailers or bubble packs), and the like. The ergonomic height of the payload unit enhances the ability of workers to collaborate with the MDU 10, enhancing the effectiveness and safety of the overall handling system.

Elevating the payload unit to be vertically spaced apart from its driving chassis assembly in an environment in which an uneven floor or ground structure is expected, while protecting the structure of the machine from forces upon rapid decelerations and the like, creates problems not before encountered. For one (non-limiting) example, a split chassis enables the chassis to flex such that a front portion moves or pivots relative to a rear portion. Rigid support of the payload unit would inhibit flex of the chassis, and rigid supports could subject the elongate supports to high stress. The inventors address the technical hurdles by employing a four-bar linkage (as defined herein) and a brace.

The four-bar linkage in the embodiment shown in the figures is formed by a pair of solid upright supports, a portion of a payload unit, and a portion of the chassis assembly. The chassis assembly has a pivot between the mounting points of the upright supports. The pivoting magnitude of the chassis pivot is limited and plays less of a role during deceleration and acceleration than the other pivots. Thus, the structure disclosed herein is referred to as a "four bar linkage," as the front and rear chassis portions, which together make up one of the four "bars," is expected to pivot only to a small degree during normal operation of a floor.

The structure described and claimed herein can be significantly lighter weight than a correspondingly strong structure of other configurations. In other words, elevating the payload unit by the structure described herein can be lighter than other support structures while maintaining the functionality described more fully below. The decrease in weight associated with the technology disclosed herein not only has advantages in general performance, such as enhanced acceleration, battery like and the like. But creates a lower center of gravity which enables less derating of the acceleration and deceleration curves applied by the controls.

The present invention is not intended to be limited to the configuration illustrated in the figures, as many variations may be employed.

According to the embodiment shown in the figures, chassis 12 is a split chassis that includes a front chassis unit and a rear chassis unit that are hinged together such that upon encountering a floor irregularity, the front and/or rear chassis can move about a pivot. The pivoting feature of chassis 12 contributes to a low height of the mobile drive unit compared with some prior generations of like robots.

Chassis 12 of mobile drive unit 10 includes a first chassis assembly, such as front chassis assembly or unit 20, and a second chassis assembly, such as rear chassis assembly or unit 60. Front chassis assembly 20 includes a base 22, a pair of motorized wheel assemblies 24, and a front caster 26. Base 22 in the embodiment shown in the figures is a one-piece aluminum casting to which the wheel assemblies 24 and front caster 26 are mounted. Base 22 includes mounts and cut outs for receiving the left and right wheel assemblies 24, and includes a recess for mounting front caster 26. Base 22 also includes a pair of pivot mounts 69, as explained more fully below.

Figure 1:
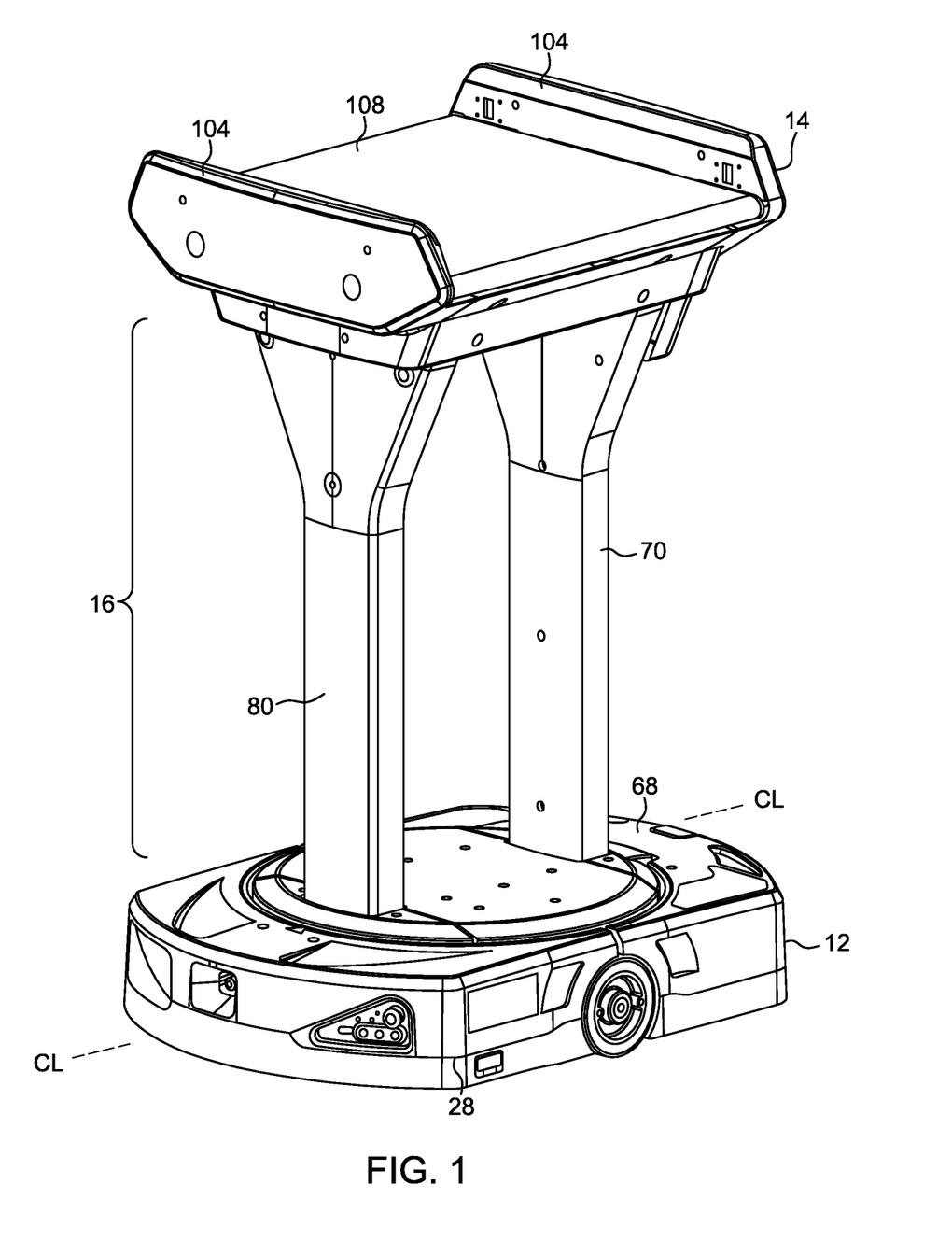
FIG. 1 is a perspective view of a mobile drive unit having a conveyor that is elevated to an ergonomic height.
Figure 2:
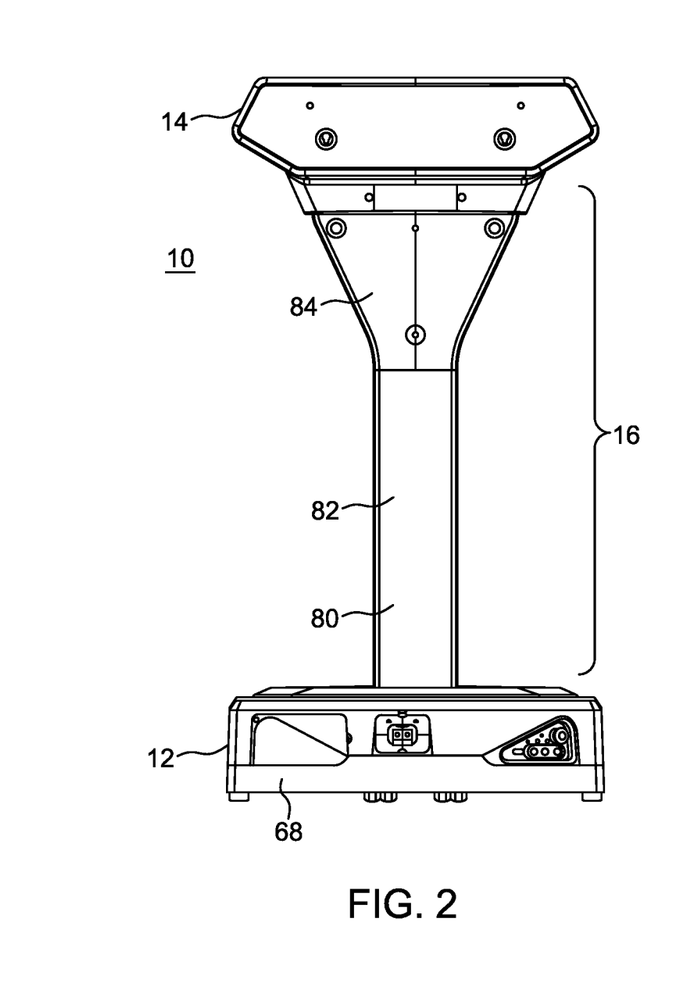
FIG. 2 is a rear view of the mobile drive unit of FIG. 1.
Figure 3:
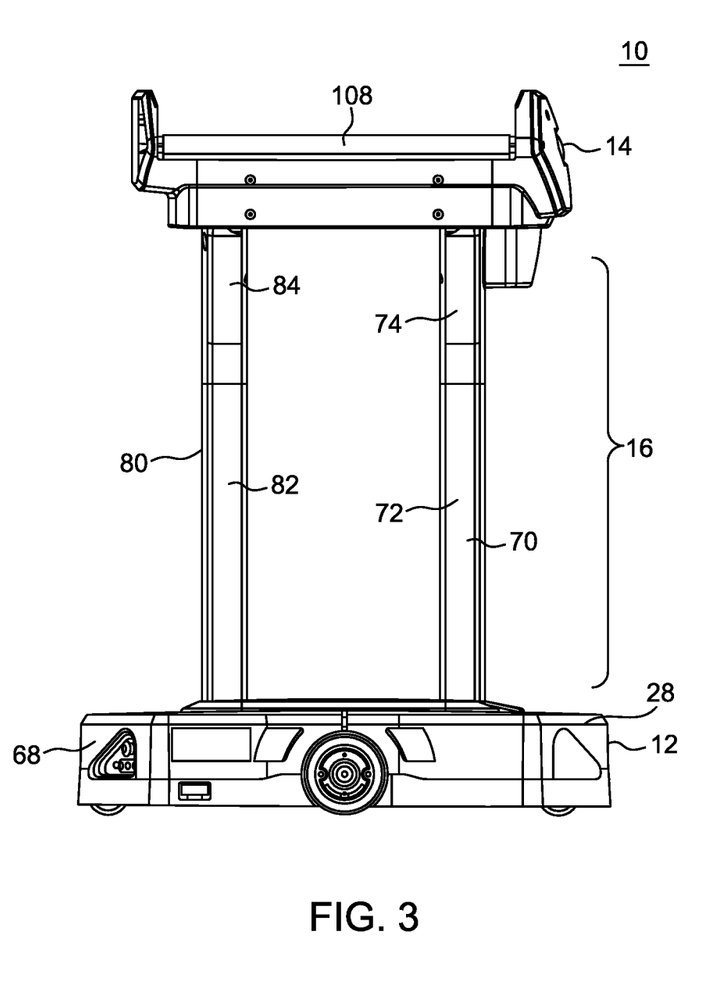
FIG. 3 is a first side view of the mobile drive unit of FIG. 1.
Figure 4:
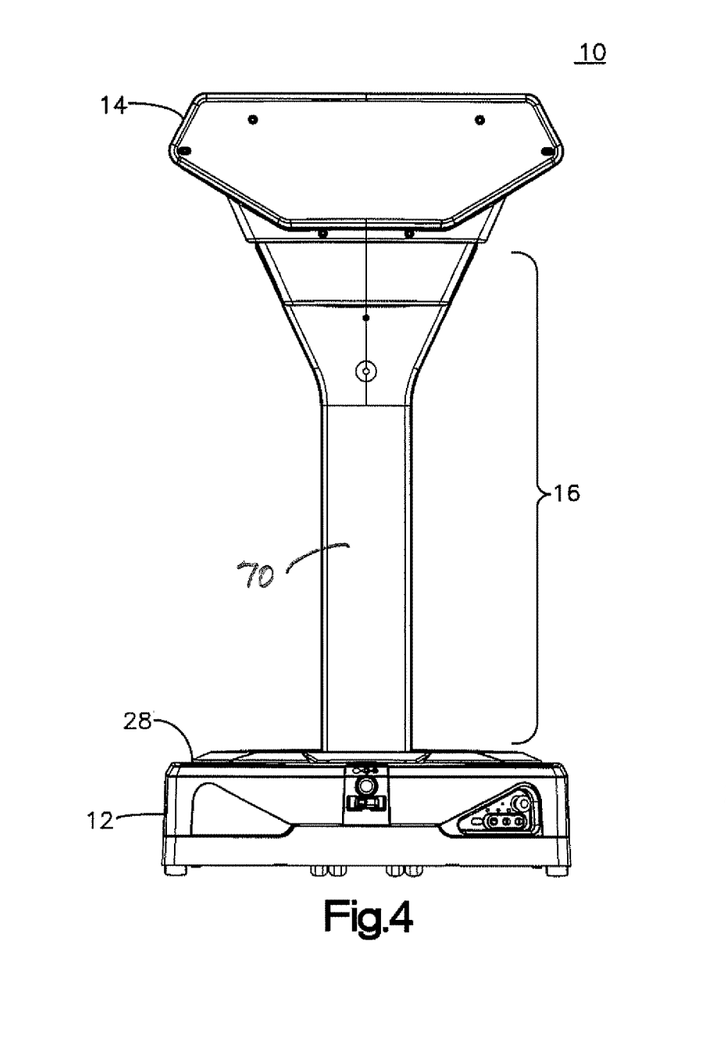
FIG. 4 is a front view of the mobile drive unit of FIG. 1.
Figure 5:
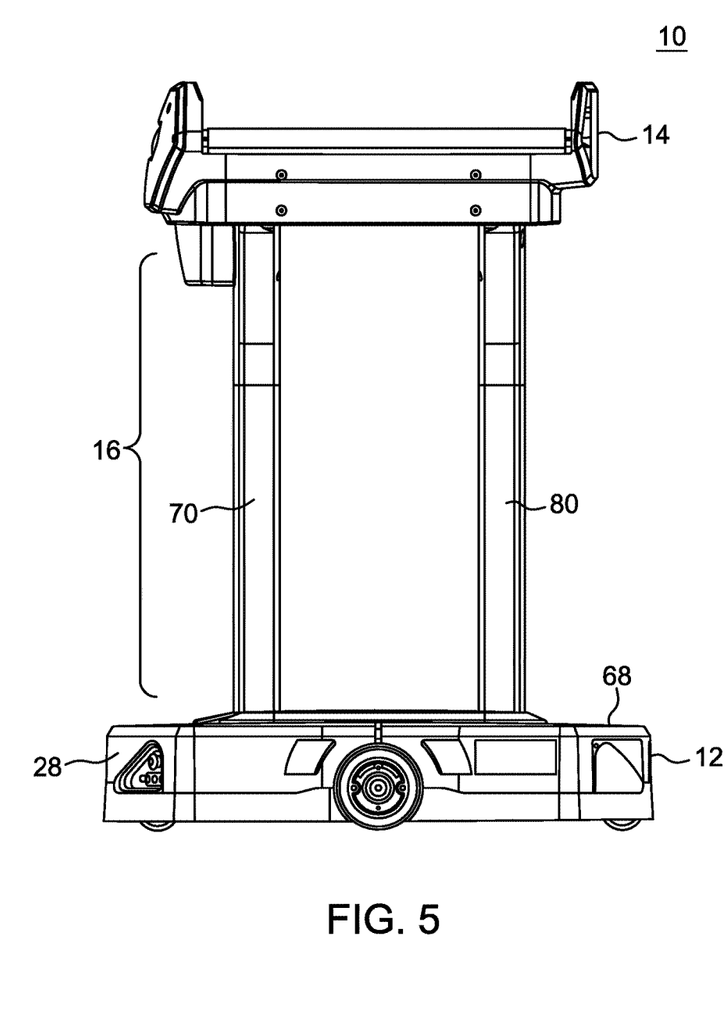
FIG. 5 is a second side view of the mobile drive unit of FIG. 1, opposite the view of FIG. 3.
Figure 6:
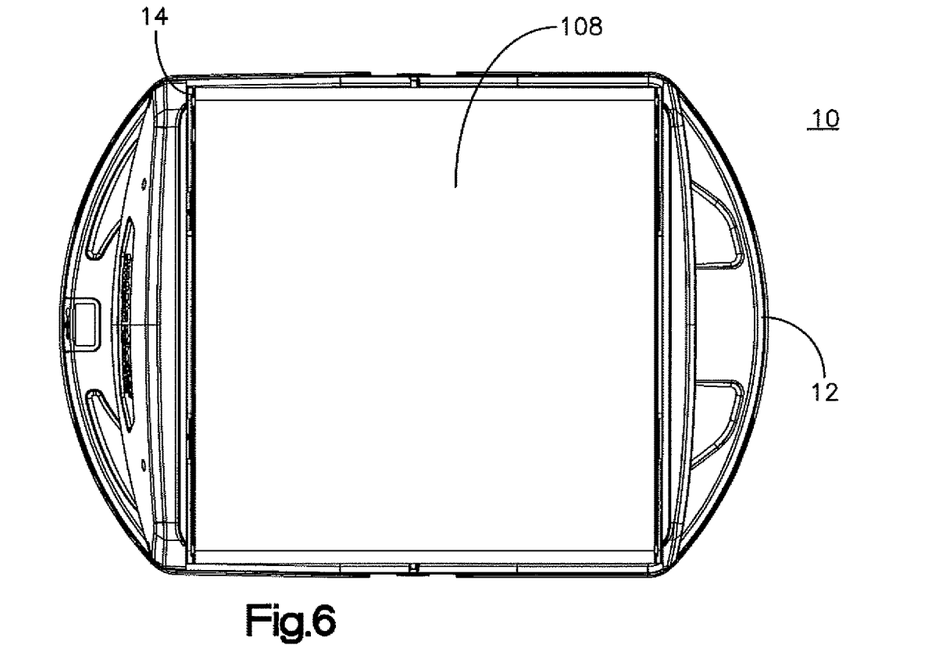
FIG. 6 is a top view of the mobile drive unit of FIG. 1.
Figure 7:
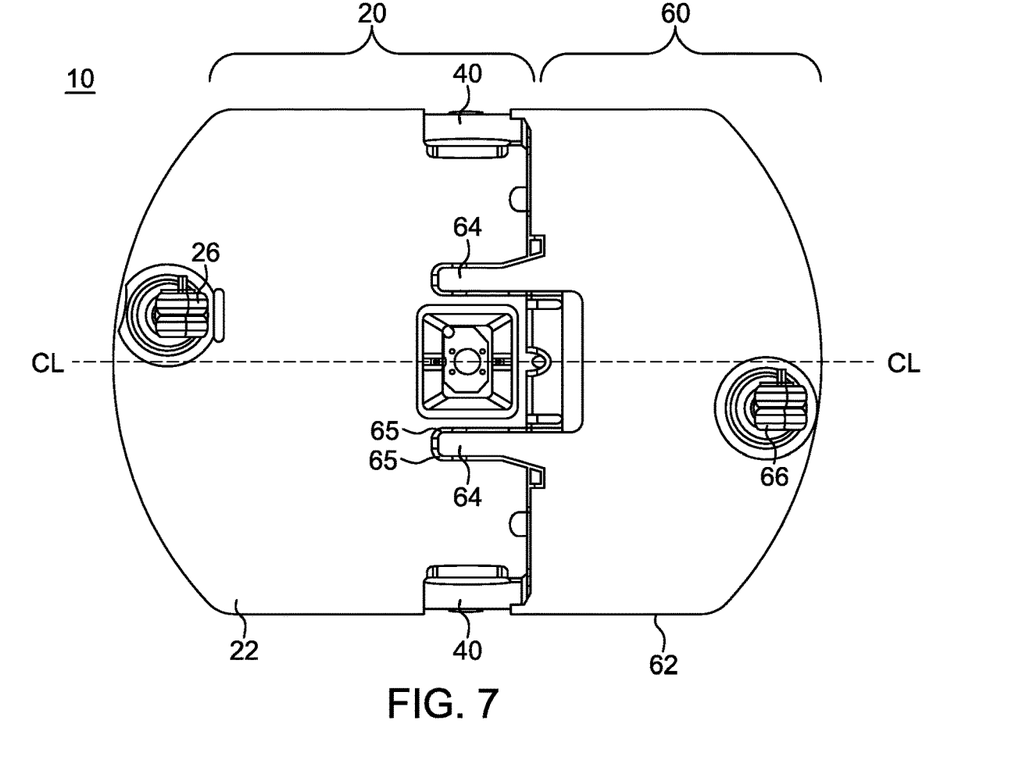
FIG. 7 is an underside view of the mobile drive unit of FIG. 1.
Figure 8:
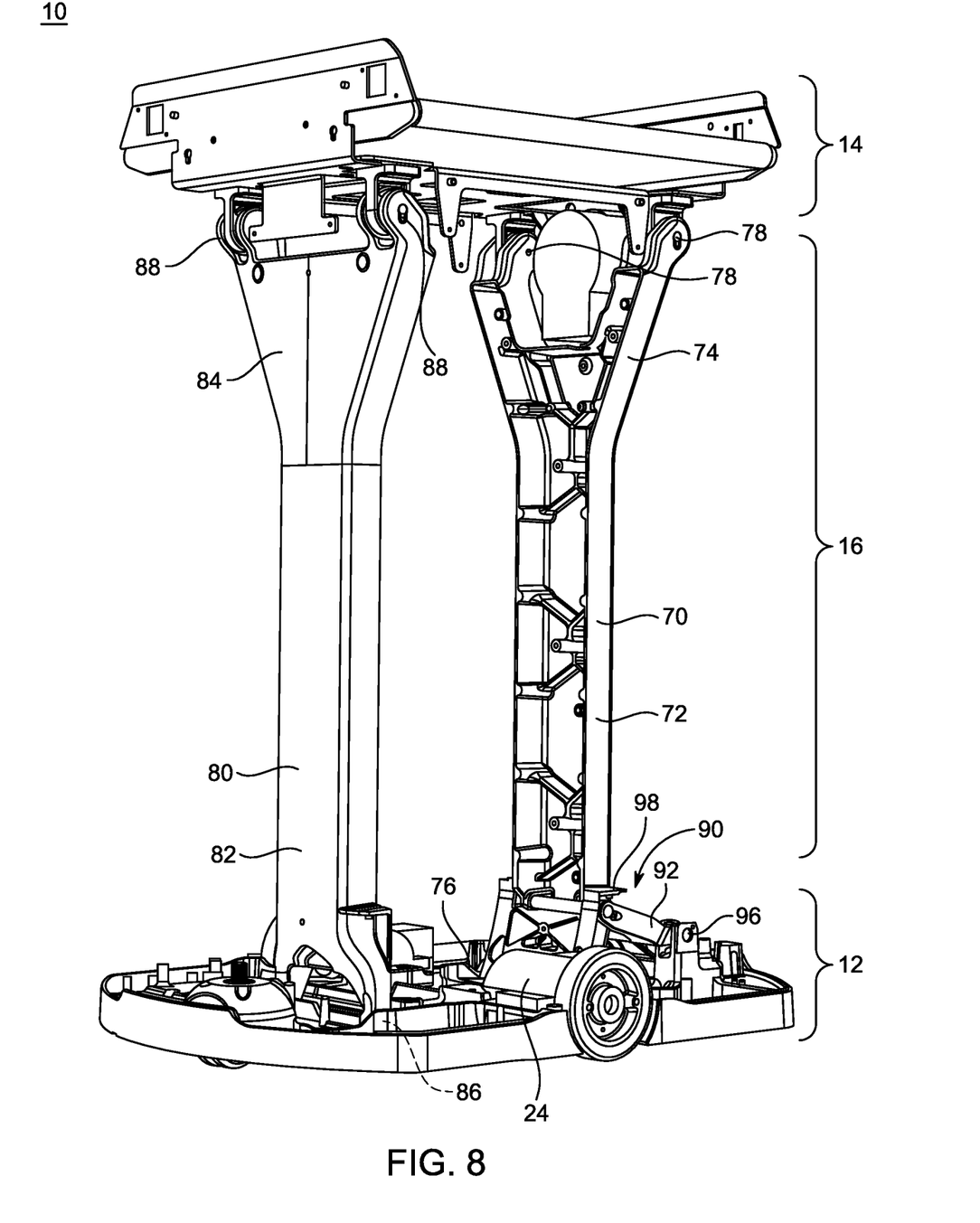
FIG. 8 is a perspective view of a mobile drive unit of FIG. 1, with portions removed for clarity.

Rear chassis assembly 60 includes a base 62 and rear caster 66. Base 62 preferably is a one-piece aluminum casting that includes a recess for mounting rear caster 66. As illustrated in FIG. 7, rear chassis assembly 60 includes a pair of forward-extending arms 64 that engage pivot mounts 65 of front base 22. A pair of pins (not shown) link arms 64 to mounts 65 to enable front base 22 and rear base 62 to pivot relative to each other. The pins define a chassis pivot axis about which bases 22 and 62 pivot or rotate as needed. The chassis pivot axis is horizontal and transverse. The chassis pivot axis is also perpendicular to a direction of forward motion, which is illustrated in FIGS. 1 and 7 by line CL, as in the embodiment shown the direction of forward motion is parallel to the centerline CL of MDU 10. Centerline CL bisects the bases 20 and 60 and is equidistant between the drive wheel assemblies 24.

Front casters 26 and 66 are mounted to base 22 and 62 (respectively)—the caster shafts extend through the base and are affixed by bolts to the corresponding base 22 and 62. Preferably, casters 26 and 66 are conventional, and may include double wheels. Casters 26 and 66 freely pivot about the vertical axis through the shafts and are not driven. In the embodiment shown in the figures, casters 26 and 66 are laterally offset from centerline CL. For example, front caster 26 is spaced apart from centerline CL to the left and rear caster 26 spaced apart from centerline CL to the right, as best illustrated in FIG. 7. The offset spacing enables the drive unit 10 to pass over a fiducial marker, such as a bar code or 3D code, in the floor without any of the wheels contacting the marker. Thus, the centerline CL of MDU 10 passes directly over a fiducial marker when the unit 10 drives forward.

Each motor assembly 24 includes a conventional motor 42 (as will be understood by persons familiar with mobile drive unit technology) and a drive wheel 40, respectively. Wheels 40 are approximately at the midpoint (fore and aft) of mobile drive unit 10. Each wheel 40 may be driven according to control signals to move unit 10 forward, or a direction of one of the wheels 40 can be reversed such that the drive unit 10 can rotate in place.

Referring to FIG. 7, mobile drive unit 10 can include a front cover 28 that is affixed to front base 22 and a rear cover 68 that is affixed to rear base 62. Each cover 28 and 68 have a cut-out portion that, with the corresponding cut-outs in bases 22 and 62, forms wheel cut-out that wheels 40 extend through. In this regard, wheels 40 may extend laterally to the outboard sides of mobile drive unit 10.

Each one of front base 22 and rear base 62 includes a support structure 16, which supports payload unit 14. As illustrated in the figures, support structure 16 includes a front support assembly 70 and a rear support assembly 80.

Front support assembly 70 extends from the front chassis unit 20 to an underside of the payload unit 14. Front support assembly 70 includes a pillar 72 and a lateral extension 74. Pillar 72 and lateral extension 74 each have a transverse dimension that is greater than a longitudinal dimension, and as such form a single unitary structure that provides lateral stability and enhances the ability of support assembly 70 to pivot as needed relative to both front chassis unit 20 and payload unit 14.

In this regard, a lowermost portion of pillar 72 is connected to front chassis unit 20 by a pair on longitudinal pivot mounts 76 at opposing, lateral ends of pillar 72. A single pivot that extends the width (that is, in the transverse direction) of pillar 72 or other type of pivoting structures may be employed. Thus, pillar 72 can pivot relative to front chassis unit 20 about the transverse axis, and cannot pivot about a longitudinal axis (recognizing that clearances and tolerances may provide a small degree of movement in this regard).

Lateral extension 74 extends upwardly from pillar 72 and extends laterally outward on each lateral side of pillar 72. Thus extension 74 has a larger transverse dimension than pillar 72 and may have the same or similar longitudinal dimension as pillar 72. An uppermost portion of extension 74 is connected to a front portion of the underside structure of payload unit 14 by a pair of longitudinal pivot mounts 78 at opposing, lateral ends of pillar 70. Thus, extension 74 can pivot relative to payload unit 14 about the transverse axis, and extension 74 cannot pivot about a longitudinal axis (that is, transversely).

Rear support assembly 80 extends from the rear chassis unit 60 to an underside of the payload unit 14. Rear support assembly 80 includes a pillar 82 and a lateral extension 84. Pillar 82 and lateral extension 84 each have a transverse dimension that is greater than a longitudinal dimension, and as such form a single unitary structure that provides lateral stability and enhances the ability of support assembly 80 to pivot as needed relative to both rear chassis unit 60 and payload unit 14.

In this regard, a lowermost portion of pillar 82 is connected to front chassis unit 60 by a pair on longitudinal pivot mounts 86 at opposing, lateral ends of pillar 82. A single pivot that extends the width (that is, in the transverse direction) of pillar 82 or other type of pivoting structures may be employed. Thus, pillar 82 can pivot relative to front chassis unit 60 about the transverse axis, and cannot pivot about a longitudinal axis (recognizing that clearances and tolerances may provide a small degree of movement in this regard).

Lateral extension 84 extends upwardly from pillar 82 and extends laterally outward on each lateral side of pillar 84. Thus extension 84 has a larger transverse dimension than pillar 82 and may have the same or similar longitudinal dimension as pillar 82. An uppermost portion of extension 84 is connected to a front portion of the underside structure of payload unit 14 by a pair of longitudinal pivot mounts 88 at opposing, lateral ends of pillar 82. Thus, extension 84 can pivot relative to payload unit 14 about the transverse axis, and extension 84 cannot pivot about a longitudinal axis.

The pivot mounts 76, 78, 86, and 88 enable the structures between the mounts to form a four-bar linkage. A brace 90 stabilizes the four-bar linkage by limiting the degree of pivoting. In the embodiment of the figures, brace 90 includes a body 92 and a pair of pivot mounts 96 and 98 on opposing ends of body 92. Body 92 is rigid. Pivot mount 96 is formed between body 92 and a structural portion or bracket of front chassis unit 22. Pivot mount 98 is formed between body 92 and a portion of front support 70. In the embodiment of the figures, the location of pivot mount 98 is between pivot mounts 76 and 78 of support 70, on pillar 72, and near chassis unit 22. As explained above, the definition of a four-bar linkage, as used herein, encompasses the pivoting of front and rear chassis relative to one another.

The pivot mounts of the four-bar linkage may have any configuration that performs the pivotal connection function. The pivot mounts 76, 78, 86, 88, 96, and 98 permit or enhance the support of payload 14 by supports 70 and 80 while front and rear chassis units 20 and 60 pivot at mount 64 and 65 to enhance the function of the mobile drive unit. For example, pivot mounts of the chassis units 20 and 60 enhance traction of the main drive wheels 40 when the mobile drive unit encounters a floor irregularity. And pivot mounts 76, 78, 86, 88, 96, and 98 in response to movement of chassis unit 20 relative to chassis unit 60, enable the four-bar linkage to move as unit 10 moves over irregularities in the driving surface.

In the embodiment of the figures, payload unit 14 includes a conveyor belt assembly 108. Conveyor assembly 108 includes a conveyor motor 114 that drives one or more pulleys 116. In turn, pulleys 116 move a belt 118 of conveyor 108. A support frame 120 supports pivot mounts 78 and 88, motor 114, pulleys 116, and other structure of payload unit 114.

Figure 9:
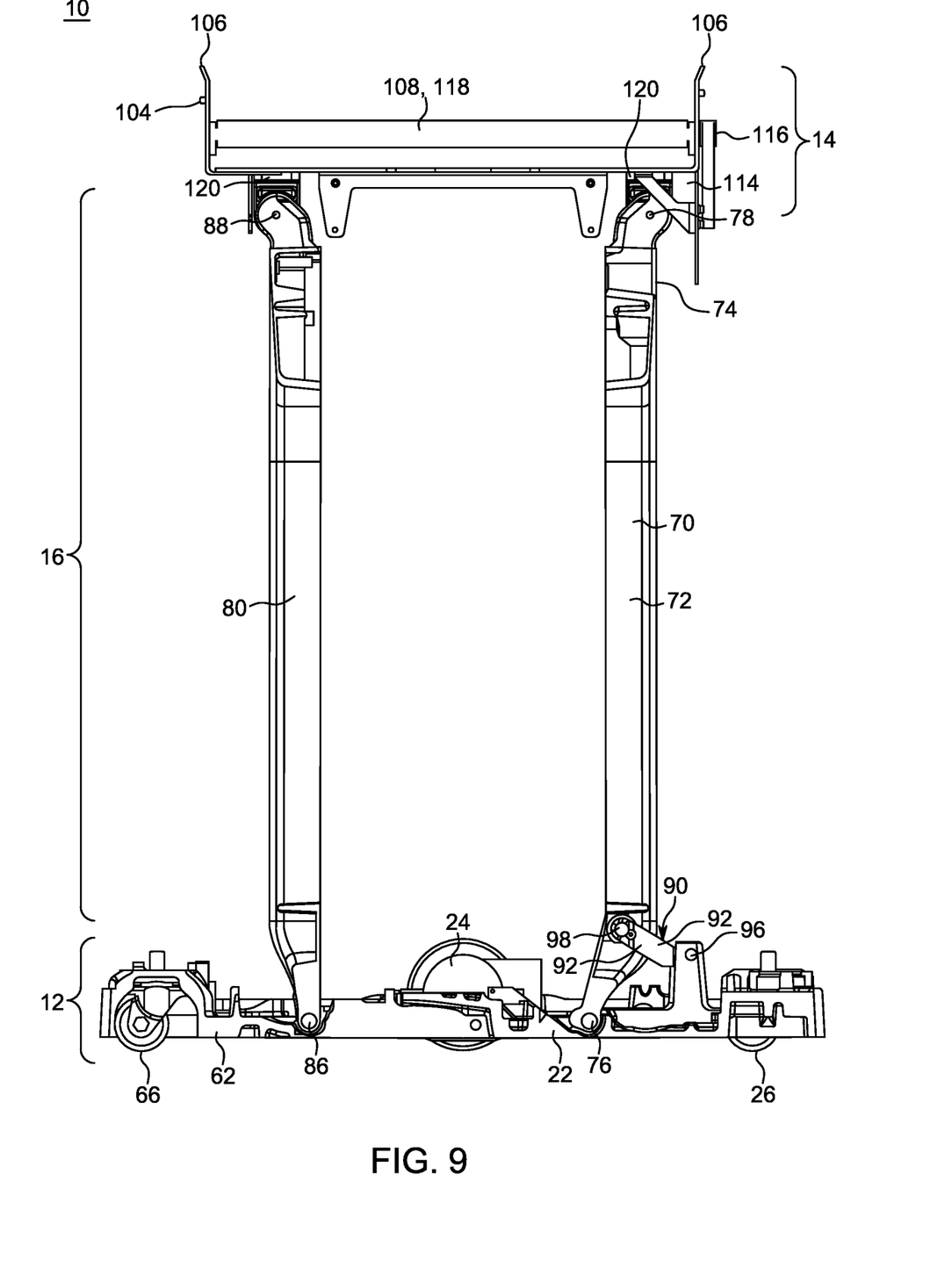
FIG. 9 is schematic view of structure of mobile drive unit of FIG. 1

Conveyor assembly 108 operates to move a payload onto or off of a top surface 102 of belt conveyor 118. In some embodiments, payload unit 14 may include one or more sensors 106 that detect the presence, location, or movement of a payload on top surface 102. Sensors may be of any type, such as (for non-limiting example) pressure sensors integrated into top surface 102, motion or distance sensors (e.g., infrared sensors or other light sensors) integrated into walls 104 bounding the sides of belt conveyor 108. As illustrated in FIG. 9, walls 104 may include eyelets. Sensors 106 may be strategically placed to detect when a payload is at risk of falling off the front or back of top surface 102. The sensor information may be used to adjust placement of the payload relative to payload unit 14.

Sensor 106 may be used to monitor the movement of a payload on top surface 102. For example, as mobile drive unit 10 is traveling to an end point, sensors 106 may monitor the location of the payload. In the event the payload moves to close to either end of belt 118, a controller 120 can cause conveyor motor 114 to adjust belt 118. In this manner, conveyor assembly 108 can control placement of a payload.

For example, based on sensor data from sensor 106, controller 120 can determine that a package on the conveyor belt assembly is within a threshold distance from an edge of conveyor belt 118. This threshold may be variable, such as based on the size of the package, such as the relative size of the package to top surface 102F. As another example, the threshold distance may be based on a change in the distance of the package from the edge of conveyor belt 118 during transport. In response to the package coming within the threshold distance of the edge of conveyor belt 118, controller 120 can operate conveyor motor 114 to cause conveyor belt 118 to move the package away from the edge of conveyor belt 118. This process can repeat as the package is jostled during transport.

In operation, a method of handling a payload can include providing a command to drive unit 10 to move along a floor to a predetermined loading location, such as an infeed belt conveyor having a package waiting to be loaded onto unit 10. The infeed conveyor and/or a person may move the package from the infeed conveyor onto conveyor 108 of drive unit 10. The level of the infeed conveyor is approximately equal to greater than the level of MDU surface 102. When a person is employed the height preferable is an ergonomic height—that is, a height that is consistent with safety and efficiency principles of human factors principles and generally consistent with U.S. Department of Labor, Occupational Health and Safety Administration guidelines. For specific example, the term "ergonomic height" can be between 32 to 38 inches between bottom of associates feet and conveyor, such that the person and MDU 10 are resting on the same datum (for example, the same floor or co-planar floors), the MDU 10 has a height at the conveyor outlet preferably between 32 and 38 inches. The MDU 10 may also be sized to cooperate with a person standing on a platform, such as a platform up to 18 inches above the floor on which the MDU is working. Thus, the height of the MDU 10 may be between 32 and 56 inches above the floor which is traverses. Preferably, the height may be chosen to be higher than the height of the discharge container into which it can eject, such as a conventional gaylord. MDU 10 can also discharge the payload onto another conveyor, a chute, and/or generally into a bin collection area. The term ergonomic height of the MDU 10 is based on the MDU and a person standing on a common datum or with the person standing up to 18 inches above the datum of the MDU 10.

The MDU 10 then moves to a discharge location, which is predetermined by the overall control system based on any inputs, to transport the payload (package) to the predetermined discharge location. The control system then may engage the conveyor motor 114 to eject the package from the MDU 10, such as into a conveyor, a chute, or a container, such as a gaylord, tote, etc.

The mobile drive unit includes controllers, cameras and other sensors, a docking port, a turntable, motors to lift and rotate the turntable, and the other components. A person familiar with mobile drive unit technology will understand how to mount and employ the additional components to the front and rear chassis units disclosed herein according to the particular goals and design of the mobile drive unit application.

The present invention has been described by employing a particular embodiment to illustrate particular features. For merely one non-limiting example, components are referred to as front and rear in order to illustrate the structure and function, but the invention is not limited to the particular front and rear orientations unless expressly stated in the claims. Further, the present invention is not limited to any structure or function, nor is the invention limited to any solution to any problem, described herein unless expressly stated in the claims. Nor is the invention limited in any way to embodying a benefit unless expressly stated in the claims. Rather, the structure and function described herein is merely an illustration, and the claims are intended to receive their full scope.

What is claimed is:

1. A mobile drive unit comprising:
   a chassis assembly including, a pair of mid-chassis drive wheel assemblies, a front chassis unit, a rear chassis unit, a front caster, and a pivotal connection between the rear chassis unit and the front chassis unit, the chassis assembly being adapted for traveling on a floor;
   an elongate front support that is pivotally supported by the front chassis unit at a first pivot mount;
   a brace coupled between the front support and the front chassis unit;
   an elongate rear support that is pivotally supported by the rear chassis unit at a second pivot mount; and
   a payload unit including a conveyor adapted for receiving and discharging at least one of paperboard boxes and mailers, the payload unit being pivotally mounted to the front support at a third pivot mount and pivotally mounted to the rear support by a fourth pivot mount, the payload unit being vertically spaced apart from the chassis assembly such conveyor is vertically spaced apart from the floor by at least an ergonomic height;
   wherein the pivotal connection of the front chassis assembly, the first pivot mount, the second pivot mount, the third pivot mount, and the fourth pivot mount are adapted to pivot upon the mobile drive unit encountering a floor irregularity.

2. The mobile drive unit of claim 1 wherein the payload unit comprises a motor configured to cause the conveyor to move the at least one of paperboard boxes and mailers away from an edge of the conveyor when detected by a sensor.

3. The mobile drive of claim 2 wherein the sensor comprises an optical sensor.

4. A mobile drive unit comprising:
   a wheeled chassis assembly including a front chassis unit, a rear chassis unit, and a pivotal connection between the rear chassis unit and the front chassis unit, the chassis assembly being adapted for travel on a floor;
   an elongate front support that is pivotally supported by the front chassis unit at a first pivot mount;
   an elongate rear support that is pivotally supported by the rear chassis unit at a second pivot mount; and
   a payload unit pivotally mounted to the front support at a third pivot mount and pivotally mounted to the rear support by a fourth pivot mount, the payload unit being vertically spaced apart from the chassis assembly such that a working surface of the payload unit is vertically spaced apart from the floor by at least an ergonomic height, and wherein the payload unit comprises a conveyor on a top surface of the payload unit, the conveyor configured to move a payload and a sensor configured to detect a payload proximate an edge of the conveyor;

the pivotal connection of the front chassis assembly, the first pivot mount, the second pivot mount, the third pivot mount, and the fourth pivot mount are adapted to pivot upon the mobile drive unit encountering a floor irregularity.

5. The mobile drive unit of claim 4, further comprising a brace connected between the chassis assembly and one of the front support and the rear support.

6. The mobile drive unit of claim 5 wherein the brace is connected between the front chassis unit and the front support.

7. The mobile drive unit of claim 6 wherein the conveyor is a belt conveyor.

8. The mobile drive of claim 7 wherein the sensor comprises an optical sensor.

9. The mobile drive of claim 8 wherein the payload unit includes sidewalls on opposing sides of the conveyor belt, the sensor being mounted in one of the sidewalls.

10. The mobile drive unit of claim 6, wherein the brace is pivotally connected to the front support and pivotally connected to the front chassis unit.

11. The mobile drive unit of claim 10 wherein the front support, rear support, the chassis assembly, and the payload unit form a four bar linkage.

12. The mobile drive unit of claim 11, wherein the front support has a front support body and the rear support has a rear support body, the front support body having a transverse dimension that is greater than a longitudinal dimension, and the rear support body having a transverse dimension that is greater than a longitudinal dimension.

13. The mobile drive unit of claim 12 wherein the front support body includes a front support pillar that is coupled to the front chassis unit and a front support lateral extension that is coupled to the payload unit and extends transversely outward from the front support pillar, and the rear support body includes a rear support pillar that is coupled to the rear chassis unit and a rear support lateral extension that is coupled to the payload unit.

14. The mobile drive of claim of claim 13 wherein the front support pillar is pivotally connected to the front chassis unit at opposing transverse ends of the front support pillar, the rear support pillar is pivotally coupled to the rear chassis unit at opposing transverse ends of the rear support pillar, the front support lateral extension is pivotally connected to the payload unit at opposing transverse ends of the front support lateral extension, the rear support lateral extension is pivotally connected to the payload unit at opposing transverse ends of the rear lateral extension support.

15. The mobile drive unit of claim 14 wherein the front support pillar and the rear support pillar are substantially vertical.

16. A method of handling a payload comprising the steps of:
   a) moving the mobile drive unit of claim 4 on a floor to a predetermined loading location;
   b) placing a payload onto the payload unit of the mobile drive unit at the loading location at an ergonomic height for a person standing on the floor;
   c) moving the mobile drive unit to a predetermined discharge location, thereby transporting the payload to the discharge location; and
   d) engaging the payload unit, thereby discharging the payload from the mobile drive unit.

17. The method of claim 16 wherein the moving step (a) and the moving step (c) including controlling power to wheels of the mobile drive unit, and the engaging step (d) includes operating a conveyor of the payload unit such that the payload is ejected from the mobile drive unit.

18. The method of claim 17 wherein the engaging step (d) further includes ejecting the payload into one of a conveyor, a chute, a container, and a bin collection area.

19. The method of claim 17 wherein the payload includes at least one of a paperboard box and a mailer.

20. The mobile drive unit of claim 4 wherein the payload unit comprises a motor configured to cause the conveyor to move a payload away from the edge of the conveyor when the sensor detects that the payload is proximate an edge of the conveyor.

* * * * *